(12) United States Patent
Richardson

(10) Patent No.: US 6,974,232 B1
(45) Date of Patent: Dec. 13, 2005

(54) COMPACT LIGHTING SYSTEM WITH IMPROVED LIGHT TRANSMISSION AND COLOR FILTERS

(76) Inventor: Brian Edward Richardson, 18675-P Adams Ct., Morgan Hill, CA (US) 95037

( * ) Notice: Subject to any disclaimer, the term of this patent is extended or adjusted under 35 U.S.C. 154(b) by 78 days.

(21) Appl. No.: 10/685,932

(22) Filed: Oct. 14, 2003

(51) Int. Cl.[7] ............................ F21V 9/00; G02B 27/28
(52) U.S. Cl. ........................ 362/293; 362/282; 359/491
(58) Field of Search ............................... 362/293, 282; 353/84, 96–97; 359/491, 502, 885, 888, 890; 348/742

(56) References Cited

U.S. PATENT DOCUMENTS

| | | | | |
|---|---|---|---|---|
| 5,126,886 A | * | 6/1992 | Richardson et al. | ........ 359/888 |
| 5,825,548 A | * | 10/1998 | Bornhorst et al. | .......... 359/578 |
| 6,729,734 B2 | * | 5/2004 | Childers et al. | ............ 353/122 |
| 6,771,325 B1 | * | 8/2004 | Dewald et al. | ............. 348/743 |
| 6,824,270 B2 | * | 11/2004 | Kim et al. | ..................... 353/31 |

* cited by examiner

Primary Examiner—Ali Alavi
(74) Attorney, Agent, or Firm—The KlineLaw Firm

(57) ABSTRACT

A lighting system including a light source, a means of collecting and focusing light from the light source, an aperture, a filter module containing at least one color filter, and an image lens. A light beam from the light source is focused through the aperture to define the image to be projected. The aperture is positioned upstream of the color filter, with the filter and the image lens being deployed in the area of the light beam where the diameter is at a minimum. The filter elements used in the filter module are two stage filters, having a first stage for a pastel level of a particular filter color, and a second stage for a saturated level of the subject color. Each stage has a gradient segment and a solid color segment. The result is a filter element with four regions that blend into each other.

28 Claims, 16 Drawing Sheets

COMPACT LIGHTING SYSTEM WITH IMPROVED LIGHT TRANSMISSION AND COLOR FILTERS

BACKGROUND OF THE INVENTION

1. Field of the Invention

The present invention relates generally to entertainment and architectural lighting, and more specifically is a device to control the hue and saturation of color emanating from a lighting fixture.

2. Description of the Prior Art

Colored light sources are often used in the theater, television, touring productions, and architectural applications. The projected light color is varied in hue, saturation level, beam size, and/or focus to obtain a particular desired artistic effect. The requirements of the effect might be that the color and/or focus remain static, or that the color and/or focus change over time. Factors that must be considered when choosing a color changing lighting system to create various effects are cost, the quantity of colors to be produced, the smoothness of color transition, size and weight of the lighting units, and the efficiency of light transmission through the color filters. The system must also provide smooth distribution of the light and the color when the light beam is projected onto a surface.

The prototypical current art system is illustrated in U.S. Pat. No. 4,914,556, by the present inventor Richardson, issued Apr. 3, 1990. Over the years, the method disclosed in the Richardson patent for changing colors produced by a lighting module has been adopted in some form by most of the major manufacturers of lighting equipment. A schematic representation of the Richardson current art system is shown in FIG. 1.

The Richardson color changing system 1 is capable of producing a great number of colors by introducing into the light path in varying degrees yellow, cyan, and/or magenta filters 2. These filters 2 are coated type filters with a gradient from nearly clear to fully saturated. A light source with a reflector 3 generates a light beam 4. The light beam 4 is directed toward a focal point 5, beyond which the light beam 4 passes through an aperture 6. After the light beam 4 passes through the aperture 6, it is directed toward the desired object by an image lens 7.

One drawback of the system disclosed in Richardson is that the percentage of light transmission is low when pastel colors are created. This factor can lead to an unsatisfactory lighting effect when pastel colors are utilized.

Another shortcoming is that due to the order of placement of the elements, the image lens 7 used in the Richardson system needs to be of a substantial size. Large lenses are costly. Moreover, large lenses do not produce a projected image with as high quality as is produced by a smaller lens.

Finally, the length of the optical path for the defined prior art system 1, again, due to the chosen order of placement, is quite substantial. The length of the optical path mandates that a lighting unit embodying this system be relatively large.

Accordingly, it is an object of the present invention to provide a lighting system that creates a vivid emitted light beam for saturated and pastel colors.

It is another object of the present invention to provide a lighting system that produces colored light beams with improved image quality.

It is still another object of the present invention to provide a lighting system that can be implemented in a compact package.

SUMMARY OF THE INVENTION

The present invention is a lighting system comprising a light source, a means of collecting and focusing light from the light source, an aperture, a filter module containing at least one color filter, and an image lens.

A light beam from the light source is focused through the aperture to define the image to be projected. The aperture is positioned upstream of the color filter, with the filter and the image lens being deployed in the area of the light beam where the diameter is at a minimum. The effect of the positioning of the elements is twofold. First, because the image lens is positioned at the smallest diameter of the light beam, a minimal size of image lens is required. A smaller image lens reduces the cost of the system, and provides a better quality resultant image. Second, by positioning the filter module between the aperture and the image lens, the overall length of the optical path is reduced. (The distance between the aperture and the image lens being defined by the desired size of the projected image.) This means that a more compact housing can be used for a lighting module containing the system of the present invention.

The filter elements used in the filter module are also improved over the prior art. The filter elements are two stage filters, having a first area coated with a pastel level of a particular filter color, and a second area coated with a saturated level of the subject color. For example, the magenta filter element has a first gradient segment that has pastel color level coated areas, and also areas with no color coating. The first gradient segment transitions into a fully coated pastel (lavender) filter segment. The fully coated pastel segment transitions into a second gradient segment on a second filter area. The second gradient segment has both saturated color level filter sections and sections with pastel color filter levels. The second gradient segment gives way to a segment covered by the fully coated saturated color filter material. The result is a filter element with four regions that blend into each other. A first region, the first gradient segment, the segment partially covered with pastel level color filter material, transmits a 25% color beam. A second region, the fully coated pastel color level segment, transmits a 50% color beam. A third region, the second gradient segment, transmits a 75% color light beam, and the fourth region, the fully coated saturated color level segment, transmits a light beam that is 100% the subject color. Thus, if the magenta filter element is deployed so that the first region is introduced into the light beam, the resultant projected light is a very light lavender. If the magenta filter element is deployed so that the fourth region is in the optical path, the resultant projected light is magenta.

The construction of the filter elements can be accomplished either by overlapping two segments of filter material, or by coating a single segment with two different color coatings. Either method yields the same result, so the choice is chiefly a matter of manufacturing convenience. It should also be noted that the filter elements can be arced or linear, depending on manufacturing and installation preferences.

An advantage of the present invention is that positioning the image lens in the smallest portion of the light beam minimizes the size of the image lens required.

Another advantage of the present invention is that placing the aperture upstream of the filter module reduces the overall length of the optical path, thereby allowing construction of a more compact lighting module.

A still further advantage of the present invention is that the dual stage filter elements provide a better quality of projected light.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 2:
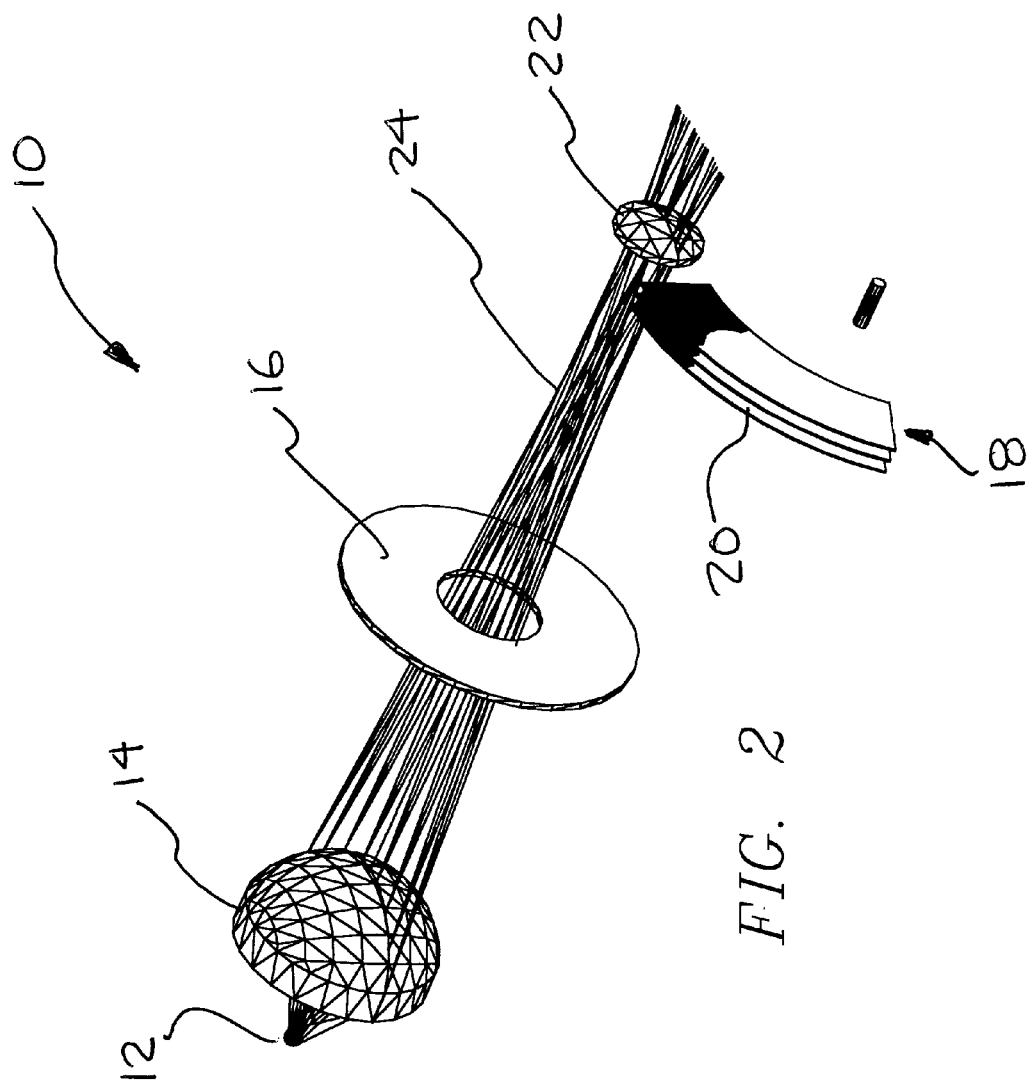
FIG. 2 is a schematic view of the lighting system of the present invention.
Figure 3:
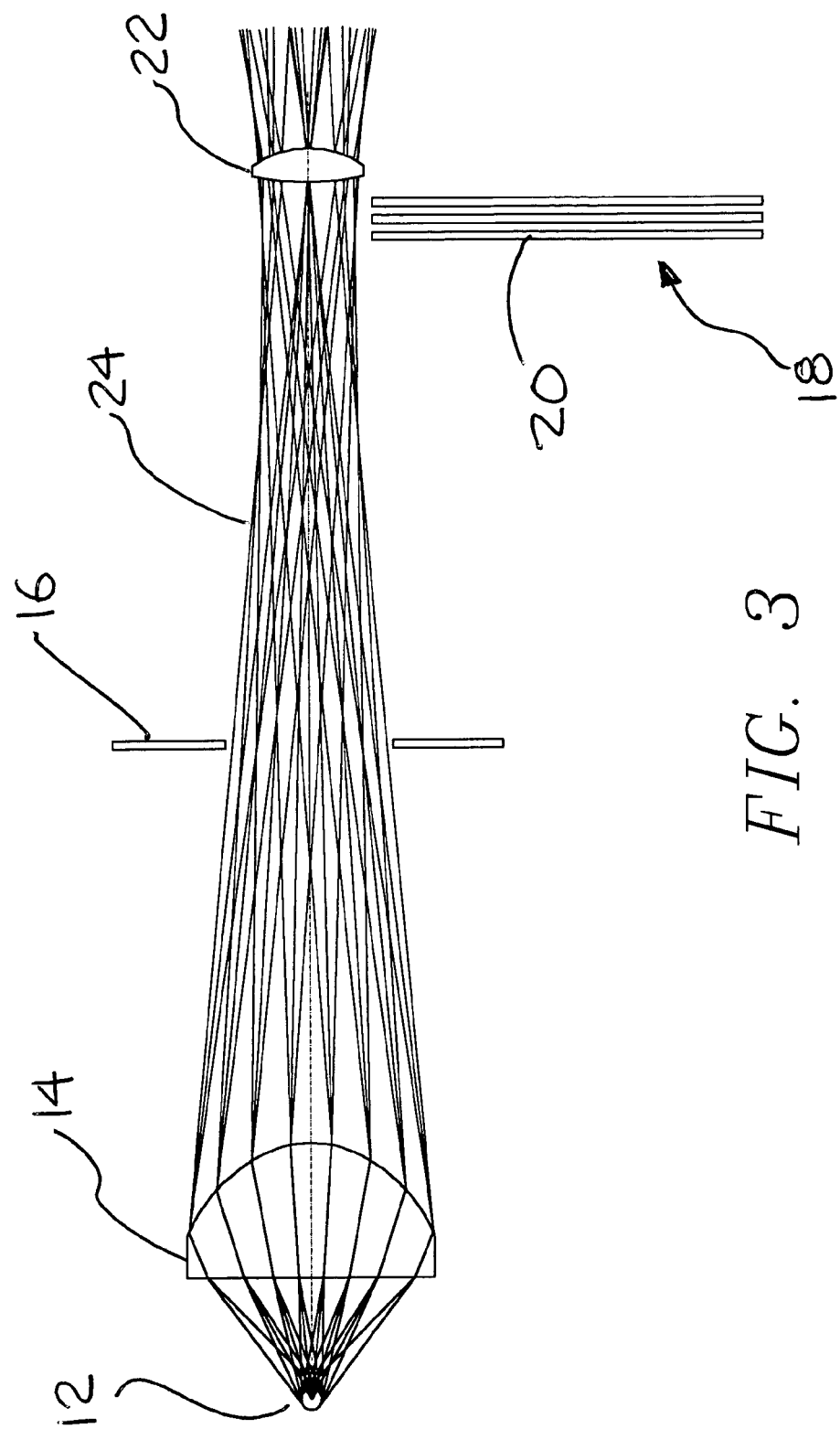
FIG. 3 shows a ray trace diagram of the light as it passes through the system.
Figure 4:
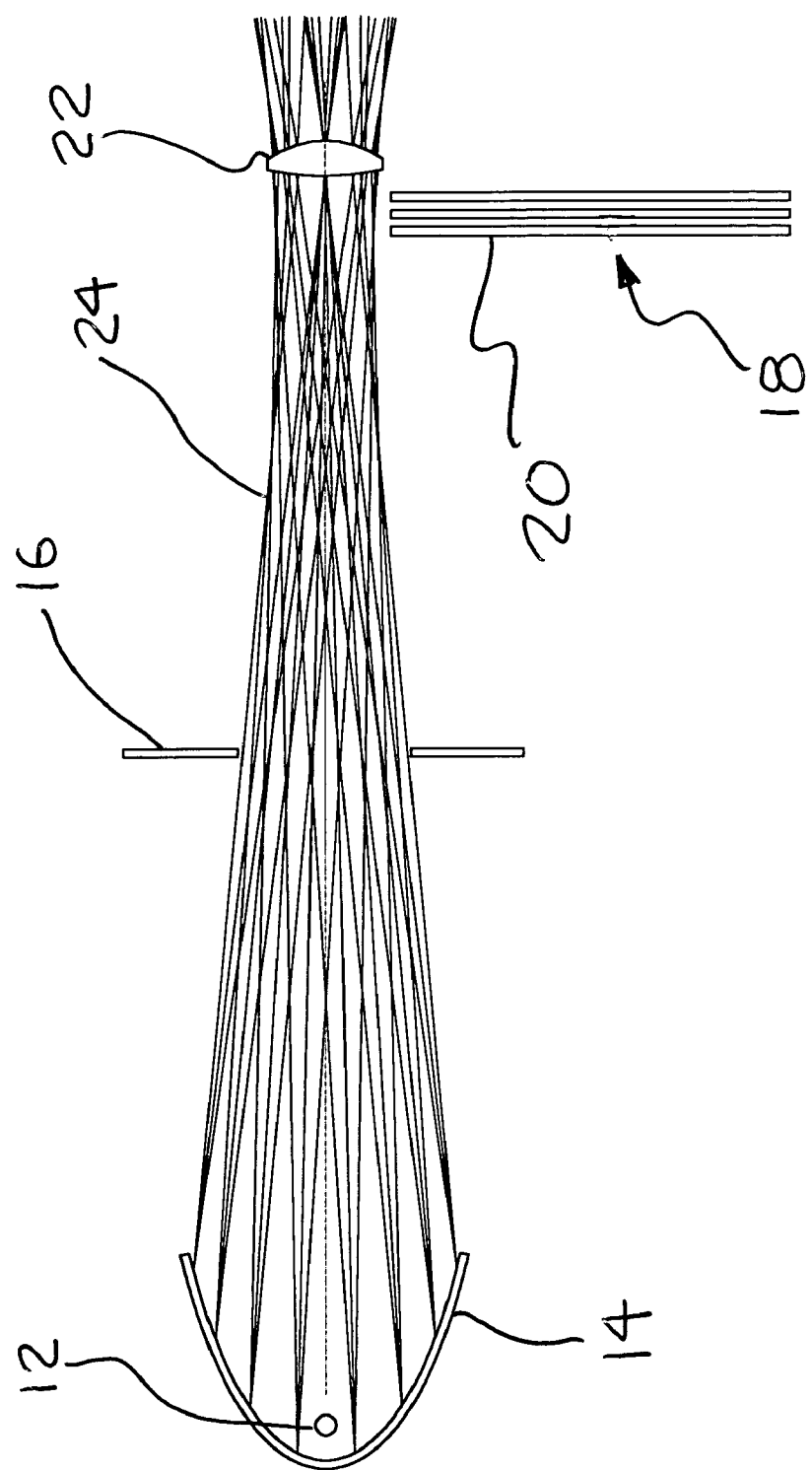
FIG. 4 shows a ray trace diagram of the light as it passes through a system with an alternative light collection means.

Referring first to FIGS. 2–4, the present invention is a lighting system 10 that comprises a light source 12, a means of collecting and focusing light 14, an aperture 16, a filter module 18 containing at least one color filter element 20, and an image lens 22.

The light source 12 can be an incandescent light, an arc lamp, or one or more LED's. A light beam 24 generated by the light source 12 is directed by the means of collecting and focusing light 14. The most commonly utilized means of collecting and focusing light 14 is a condensing lens as is illustrated in FIGS. 2 and 3. Other collecting and focusing means 14 known by those skilled in the art can also be used, such as the elliptical reflector illustrated in FIG. 4.

After the light beam 24 is directed through the condensing lens 14, the beam 24 passes through an aperture 16. The aperture 16 defines the object of the lighting system 10. After the light beam 24 passes through the aperture 16, it reaches an image lens 22. The image lens 22 focuses the light beam 24 into the image projected by the system 10. The projected light is then typically directed onto a wall or a scenic element.

Figure 5:
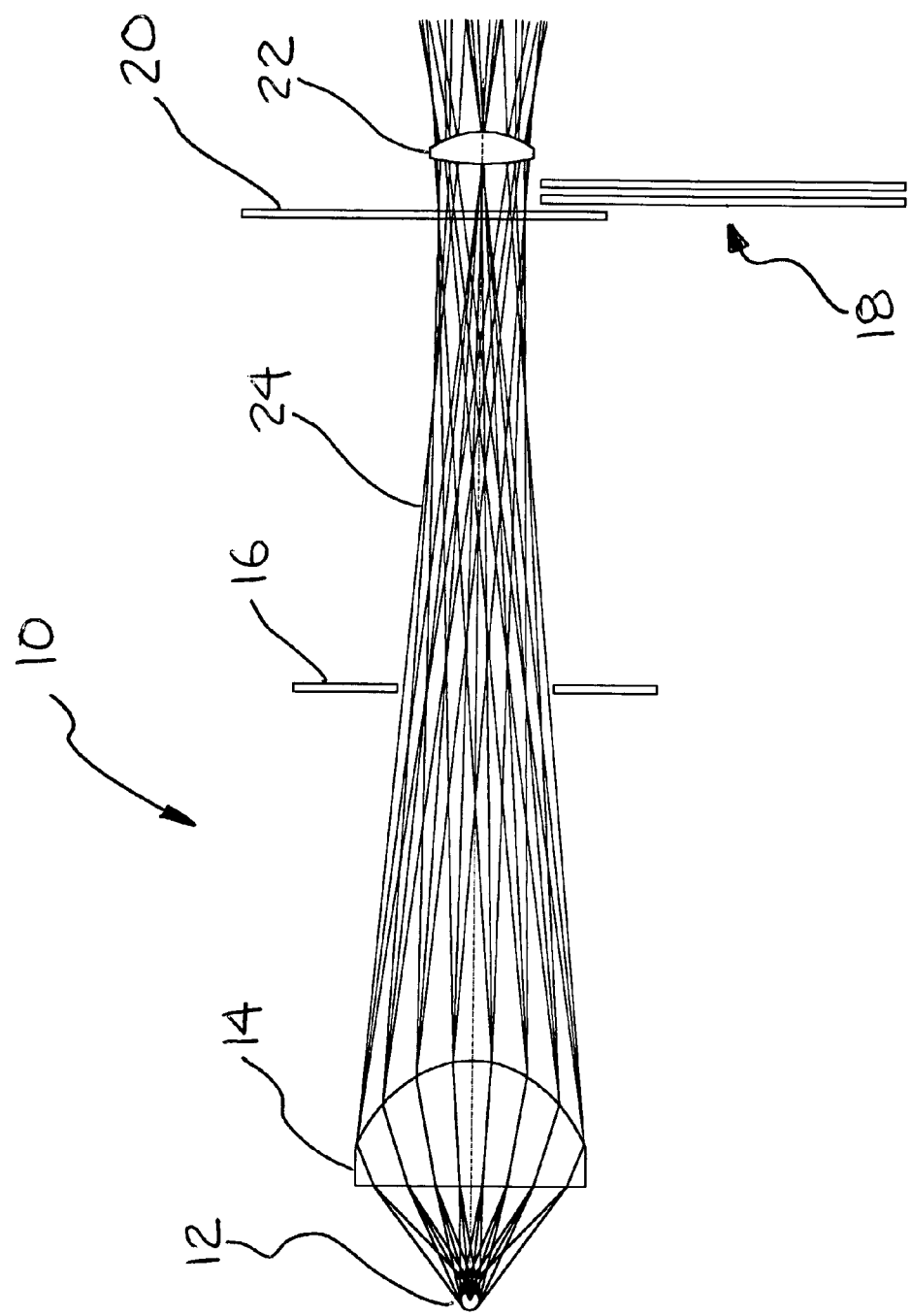
FIG. 5 shows a ray trace diagram of the system with one of the filter elements engaged.

The filter module 18 containing a plurality of filter elements 20 is positioned between the aperture 16 and the image lens 22. The filter module 18 enables a user to selectively introduce one or more filter elements 20 into the light beam 24 to achieve the desired lighting effect. FIG. 5 illustrates the system 10 with a single element 20 of the filter module 18 introduced into the optical path. The deployed filter element 20 impinges on the light beam 24 so that the projected image is modified.

The order of positioning of the elements of the system 10 is crucial to its function. By placing both the filter module 18 and the image lens 22 at the area in which the light beam 24 has a minimal cross sectional area A, (see FIG. 3), the size required for the image lens 22 is minimized. A smaller lens is both easier and cheaper to manufacture, and the smaller lens yields a better quality image. The smaller lens also allows the use of smaller filters.

Figure 1:
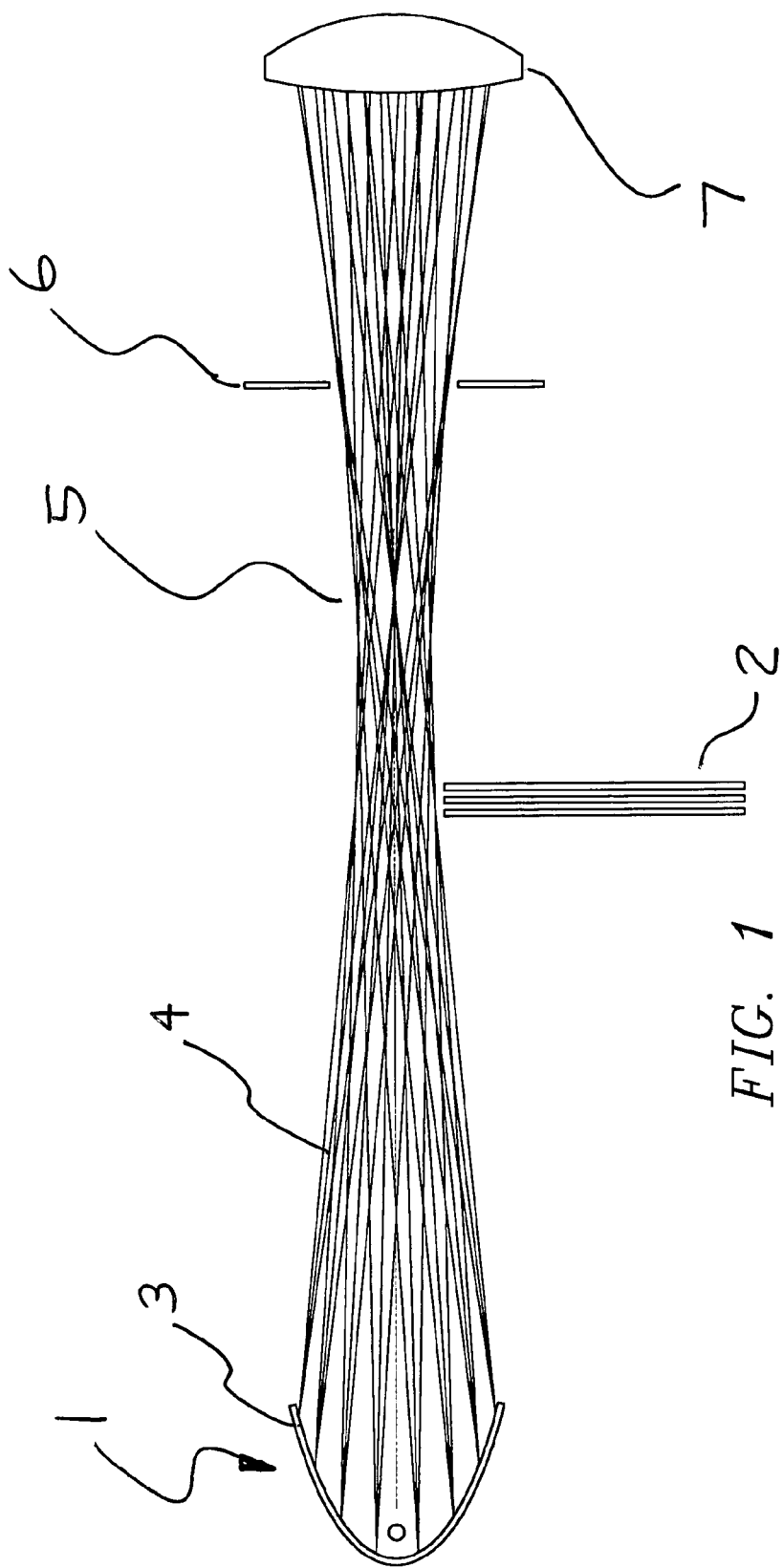
FIG. 1 shows a ray trace diagram of a prior art lighting system.

The filter module 18 is positioned between the image lens 22 and the aperture 16. This placement contrasts with that of prior art devices as illustrated in FIG. 1. Traditionally, the filter module 2 is placed upstream of the aperture 6. The distance between the aperture and the image lens is fixed for a given size of projected image. Therefore, placing the filter module 18 between the aperture 16 and the image lens 22, as opposed to immediately after the light source, reduces the overall length of the system 10. A reduced length means that the system 10 can be packaged in a more compact housing than prior art systems.

Referring now to FIGS. 6–9, the lighting system 10 of the present invention utilizes improved filter elements 20. The filter elements 20 can be either interference type filter or absorption type filters. Each filter element 20 is a two stage element, with a first stage 201 being coated with a pastel level of the selected filter color, and a second stage 202 being coated with a saturated level of the subject color. In order to smoothly transition between a very light pastel color and a saturated color for the projected light, the pastel color stage 201 includes a gradient segment 2011 that includes areas completely covered with filter material and areas with no filter material, i.e. that are clear. A second segment of the pastel color stage 201, a solid filter segment 2012, is completely coated with pastel filter material.

Similarly, the second stage 202 includes a second gradient segment 2021 and a solid saturated color filter segment 2022. Thus, each filter element 20 has filter material ranging in a first stage 201 from a pastel color gradient segment 2011 that is covered partially by the pastel color filter material and that is partially clear, to a solid area of pastel color 2012. As the filter module 18 is moved further into the light beam 24, the second stage 202 enters the beam, with the saturated color gradient segment 2021 that is covered partially by the saturated color filter material and that is covered completely by the pastel color filter material affecting the resultant light. Finally, the solid area of saturated color 2022 is brought to bear to produce completely saturated output color. The rate and extent of the color transition in the gradient segments 2011, 2021 is of course controlled by the percentage of surface area left uncovered by filter material.

Figure 6:
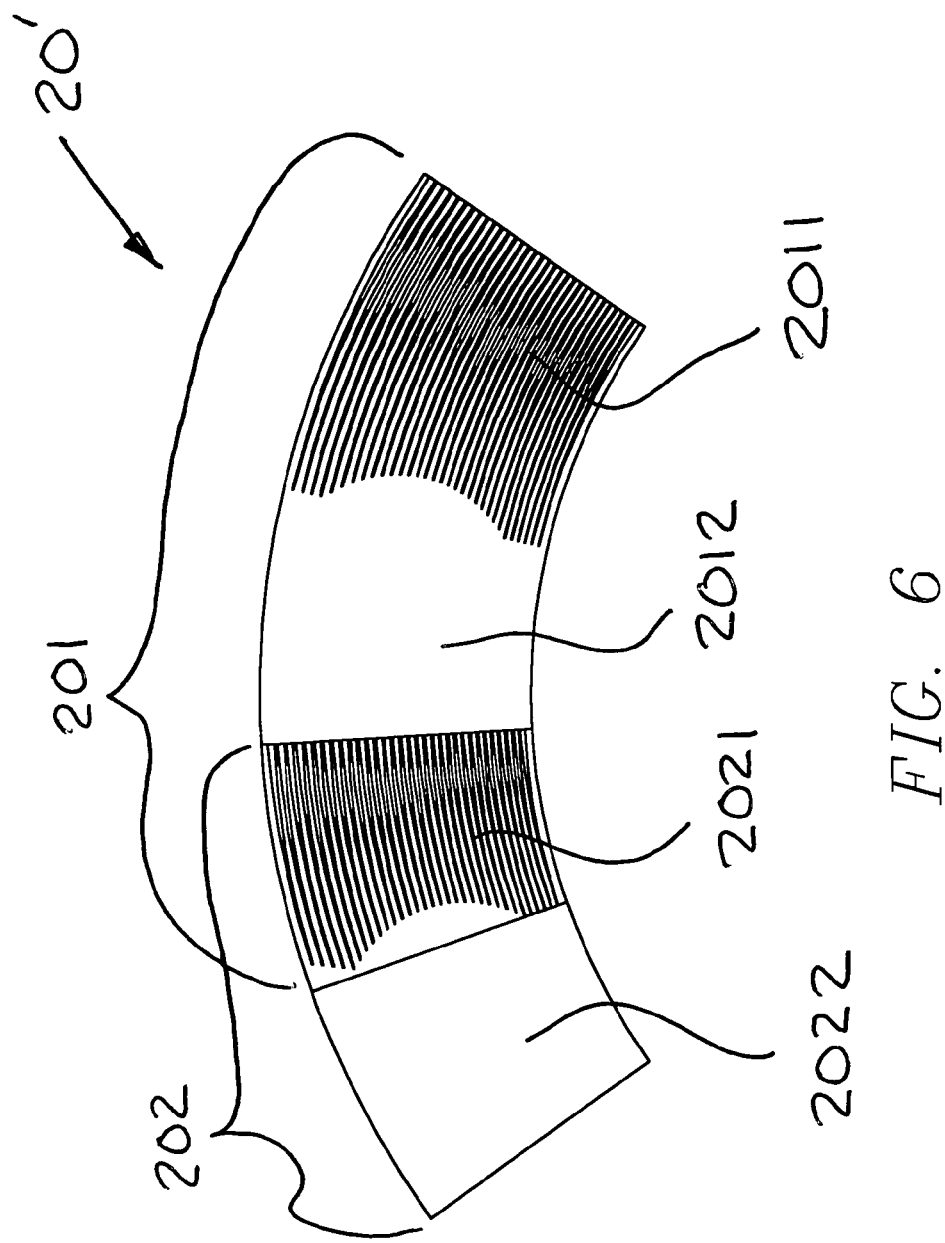
FIG. 6 is a front view of one of the color filter elements.
Figure 7:
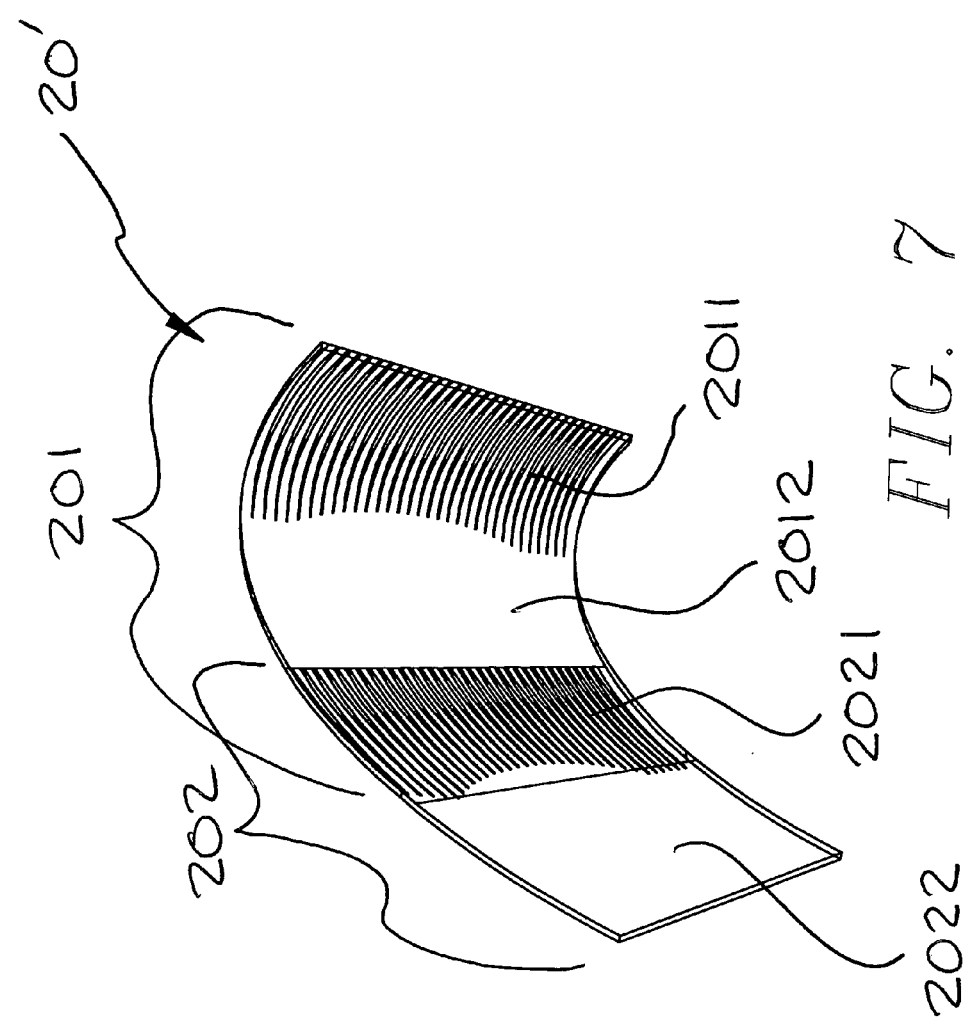
FIG. 7 is a perspective view of the color filter element shown in FIG. 6.
Figure 8:
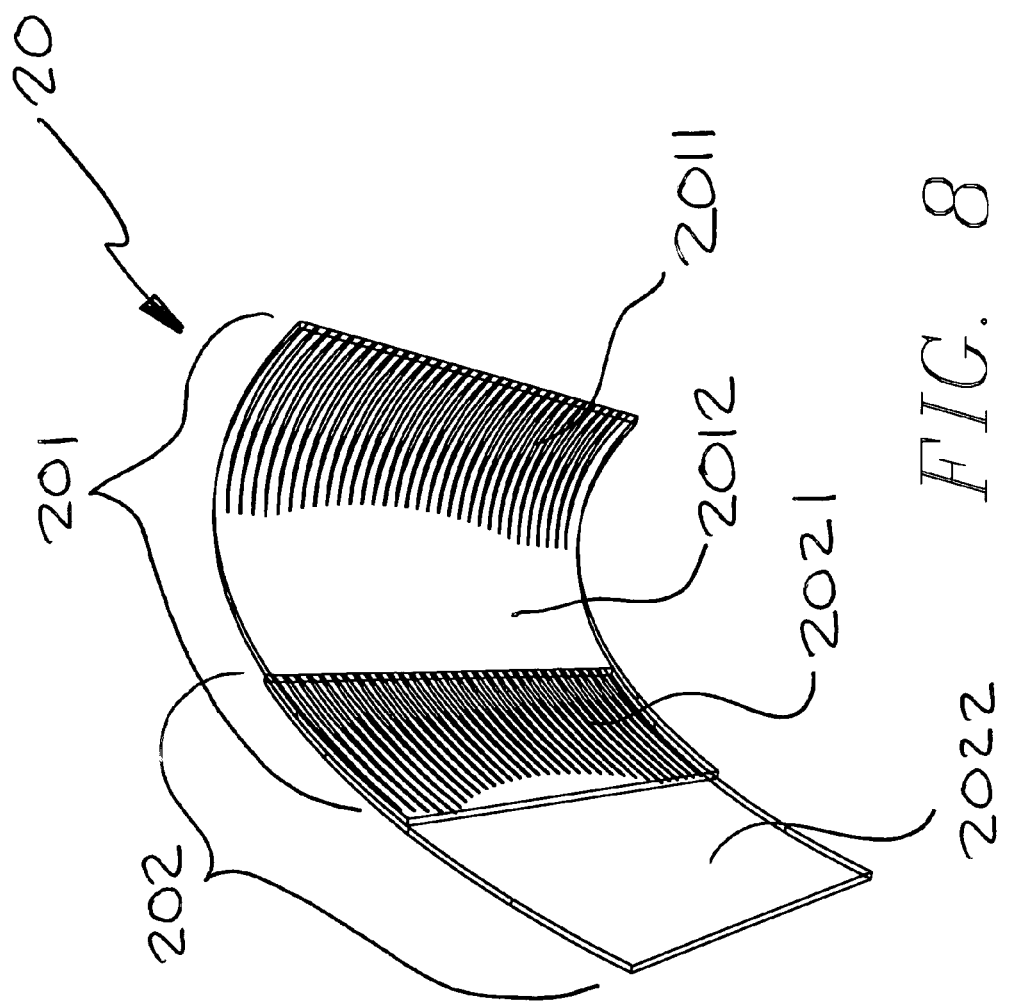
FIG. 8 is a perspective view of a color filter element with dual substrates.

There are two preferred methods of constructing the filter element 20. The element 20 can be made from two separate components, a first stage component 201 and a second stage component 202. The two components are overlapped and bonded together in place to form the filter element 20. This construction is illustrated in FIGS. 6 and 8. The second preferred construction is to simply divide a single substrate into the coated areas 201, 202 to form a unitary filter element 20' as is illustrated in FIG. 7. Areas 201, 202 can be defined by having two different coatings on one side of the substrate, or by putting the coatings on opposite sides of the substrate.

Figure 9:
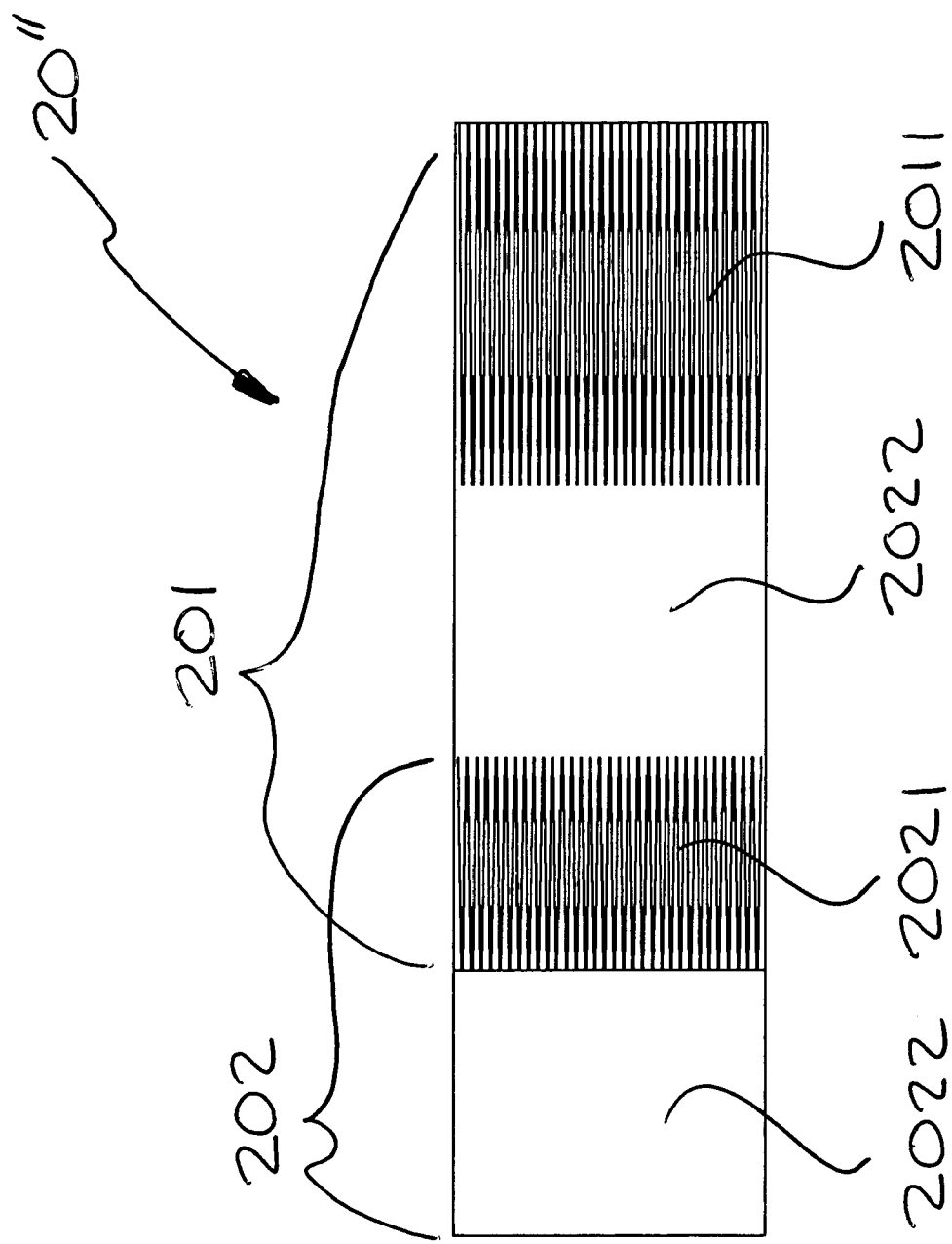
FIG. 9 is a perspective view of a linear color filter element.

Another construction for the filter element that is readily employed in the system 10 of the present invention is a linear filter element 20" as shown in FIG. 9. The linear filter element 20" would of course require a different type of actuating device to introduce the element 20" into the light beam 24, but such mechanisms are well known to those skilled in the art.

It should also be noted that there is no shape for the non-coated regions of the gradient areas 2011, 2021 that is of greater utility than another. The shape of the non-coated areas can be wedges, circles, rectangles, squares or any other pattern that may be desired by the user.

Figure 10:
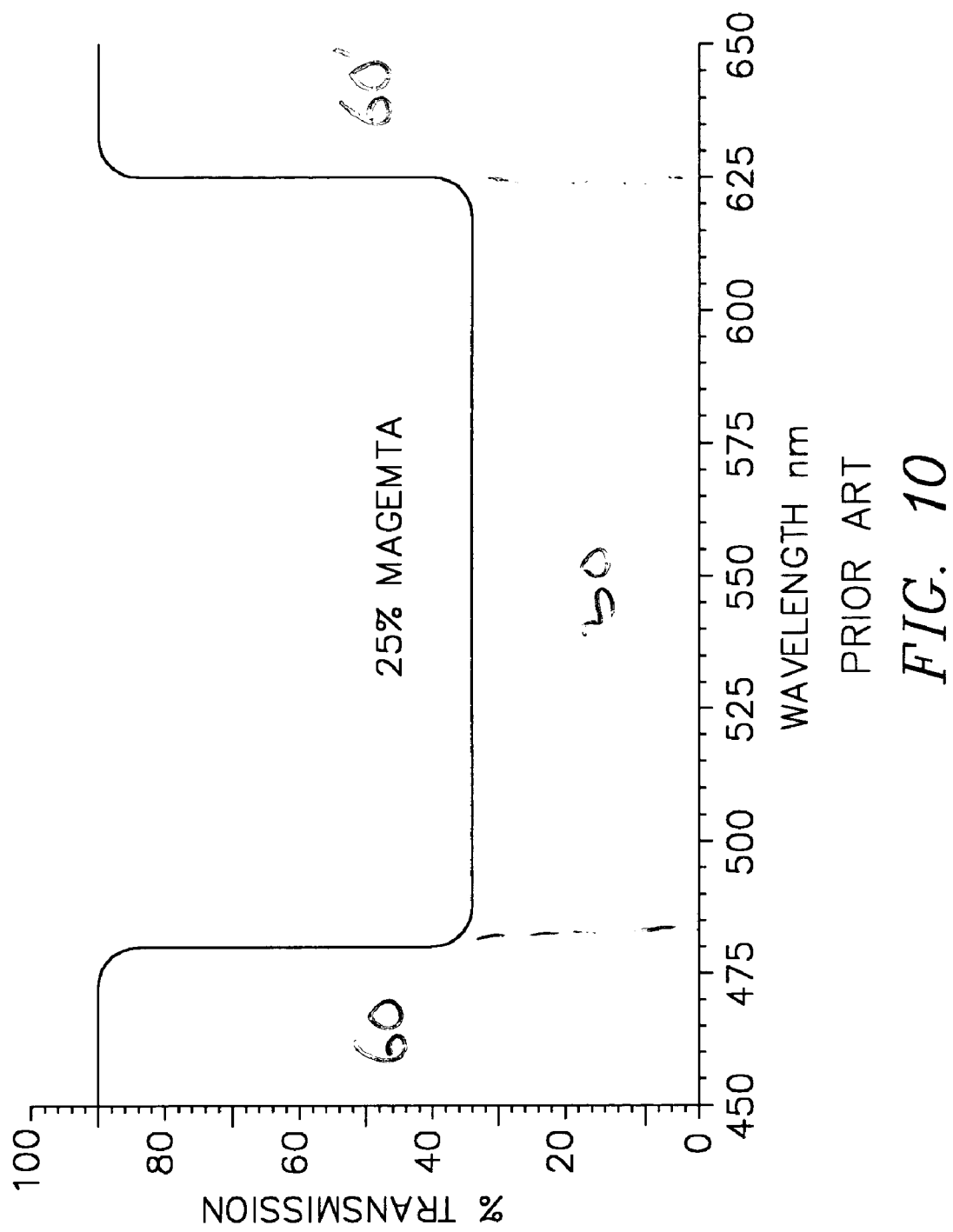
FIG. 10 is a wavelength vs. percent of light transmission plot of a prior art filter element.

The improved effect created by the two stage filter element 20, 20', and 20", particularly when a pastel color is being projected, can be seen in FIGS. 10–14. FIG. 10 shows the light transmission plot of a prior art filter element producing a pastel magenta color. The pastel magenta has a wide bandwidth of rejection. The degree of saturation of the magenta is related to the ratio of the areas of the light in the rejected areas 50 to the areas of near full transmission 60, 60'.

Figure 11:
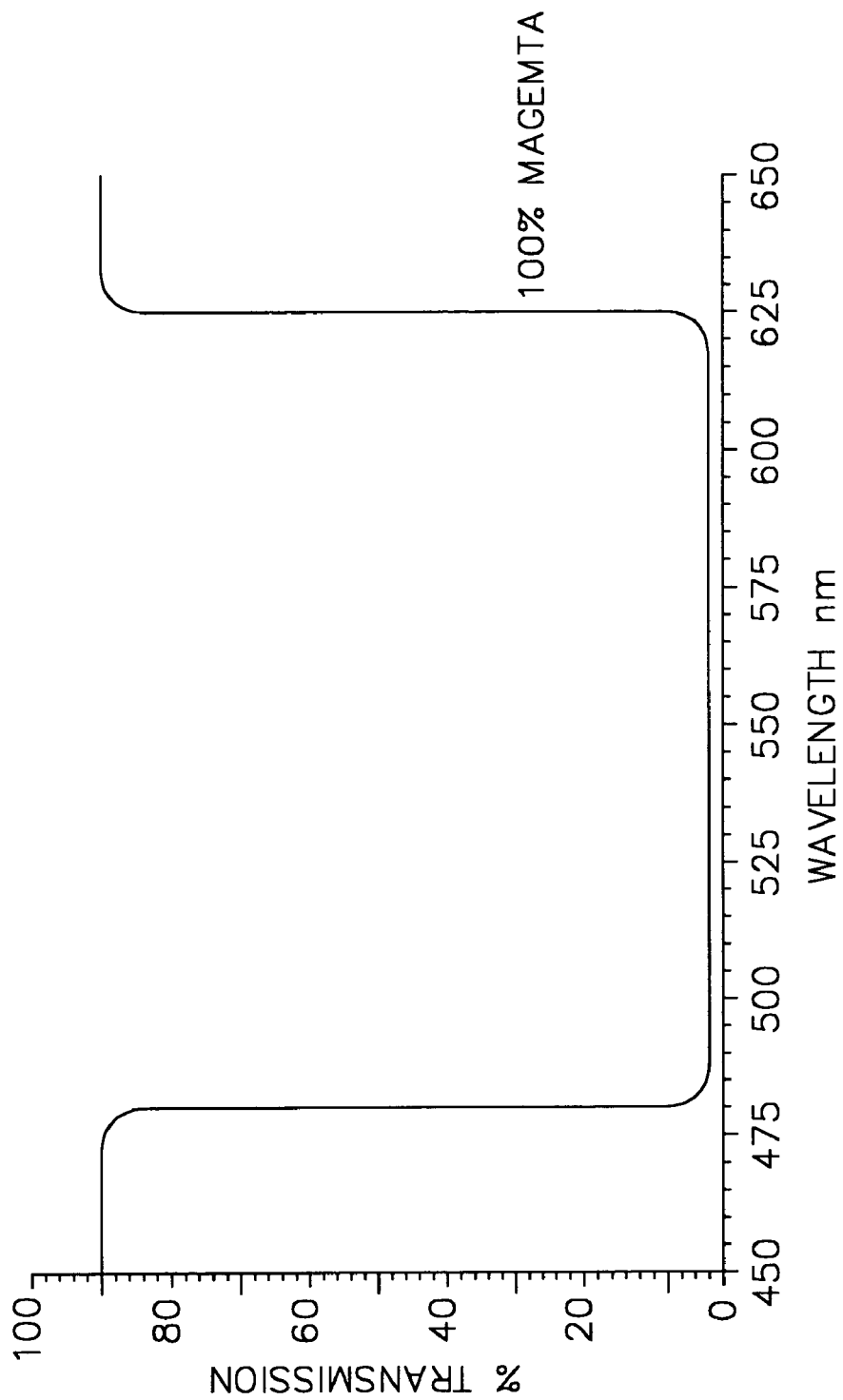
FIG. 11 is a wavelength vs. percent of light transmission plot of the magenta filter element of the present invention deployed so that the saturated portion of the first stage impinges on the light beam.
Figure 12:
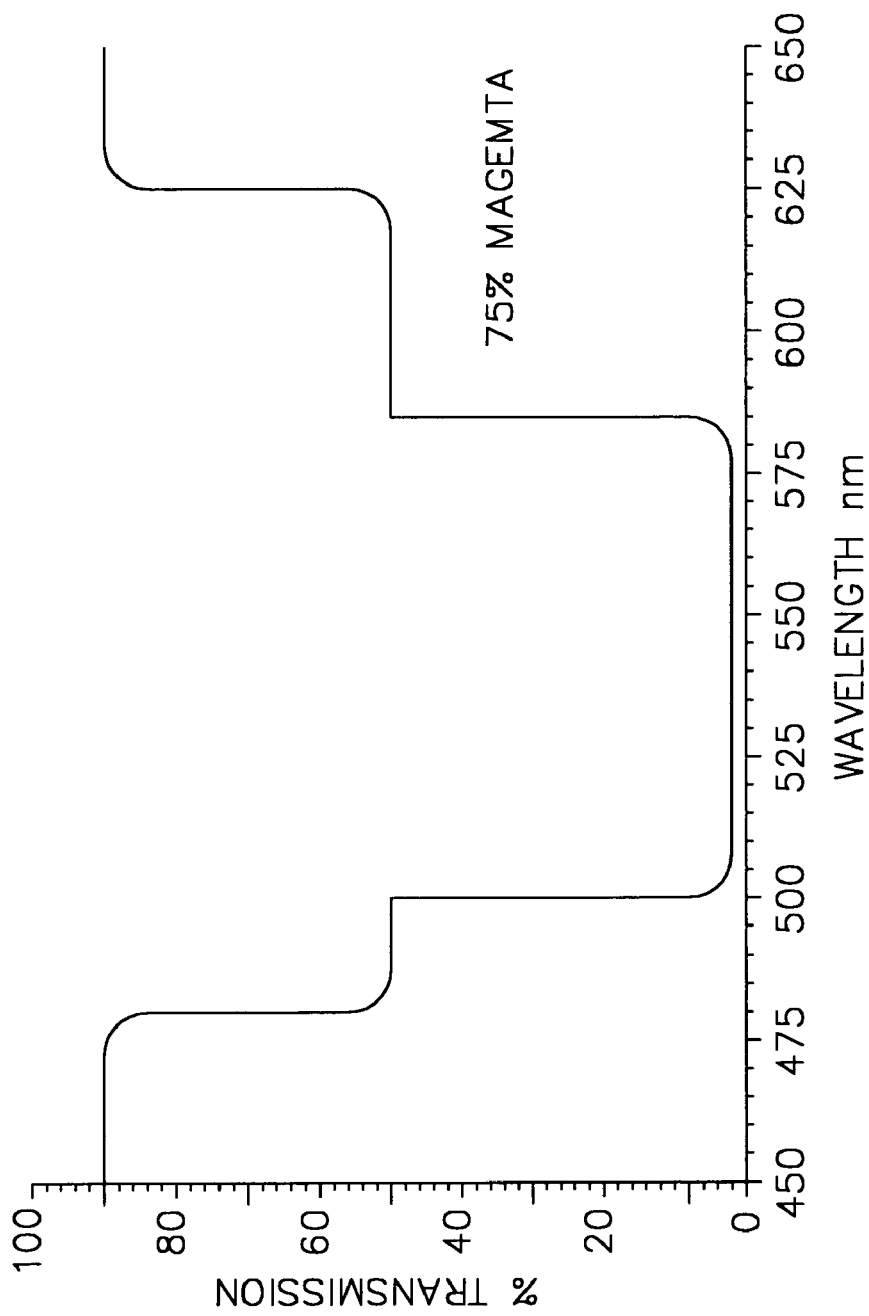
FIG. 12 is a wavelength vs. percent of light transmission plot of the magenta filter element deployed so that the gradient portion of the first stage impinges on the light beam.
Figure 13:
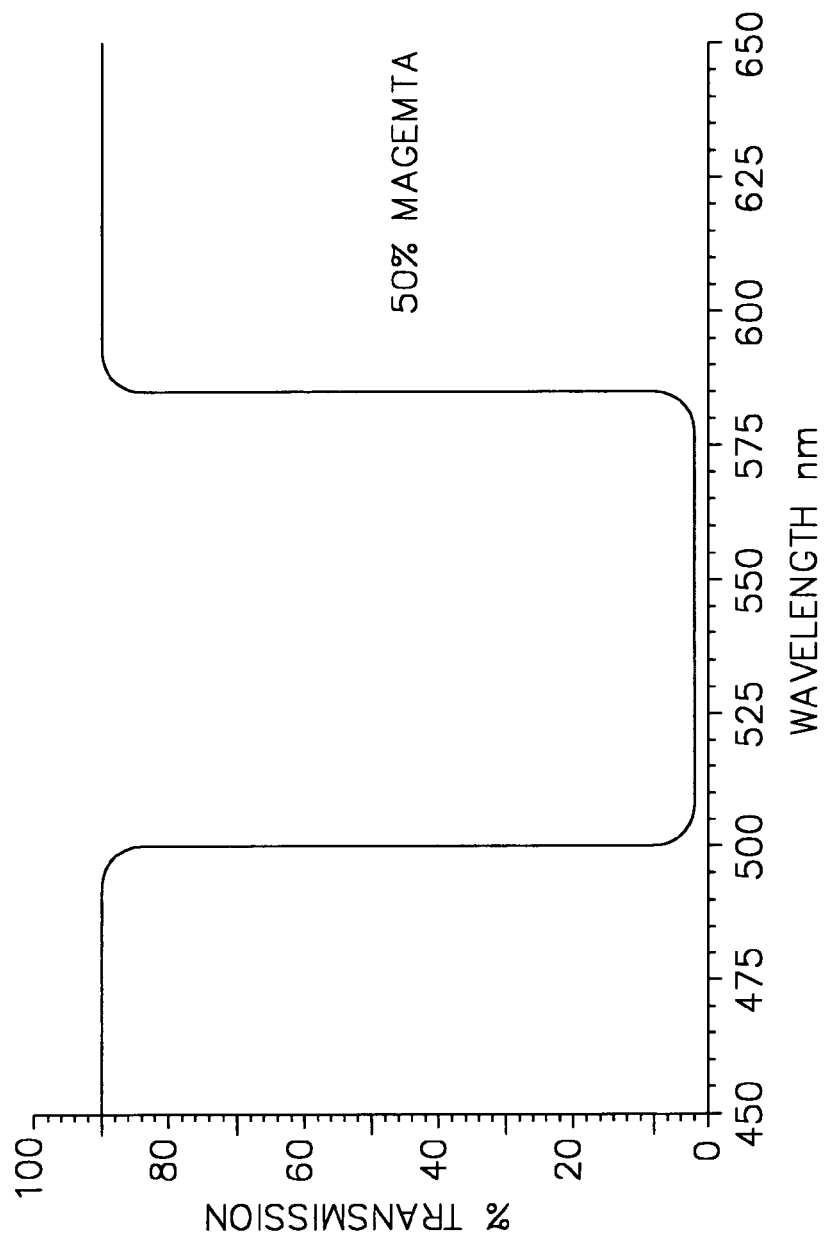
FIG. 13 is a wavelength vs. percent of light transmission plot of the magenta filter element deployed so that the saturated portion of the second stage impinges on the light beam.
Figure 14:
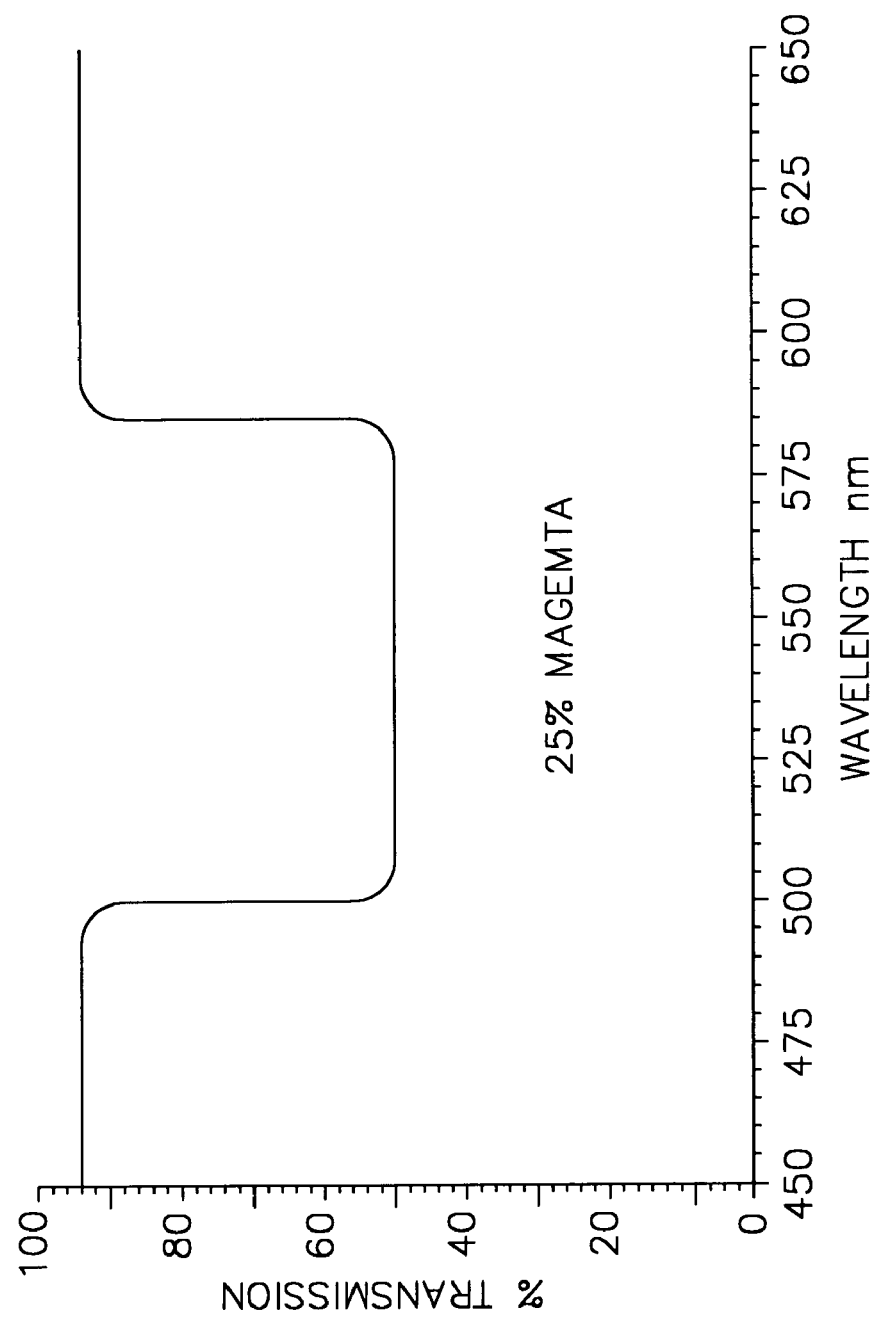
FIG. 14 is a wavelength vs. percent of light transmission plot of the magenta filter element deployed so that the gradient portion of the second stage impinges on the light beam.
Figure 15:
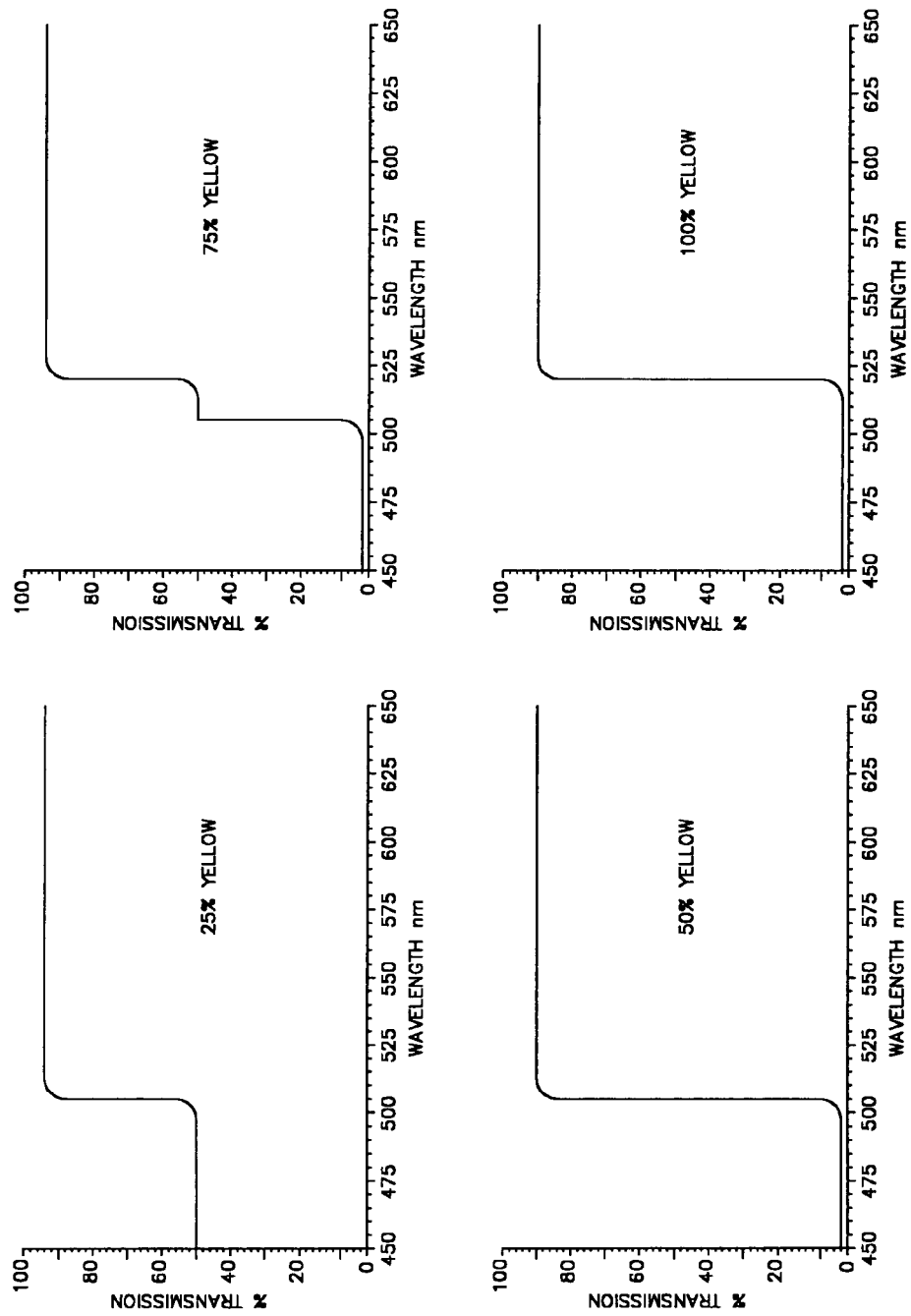
FIG. 15 shows the successive light transmission plots for a two stage yellow filter.
Figure 16:
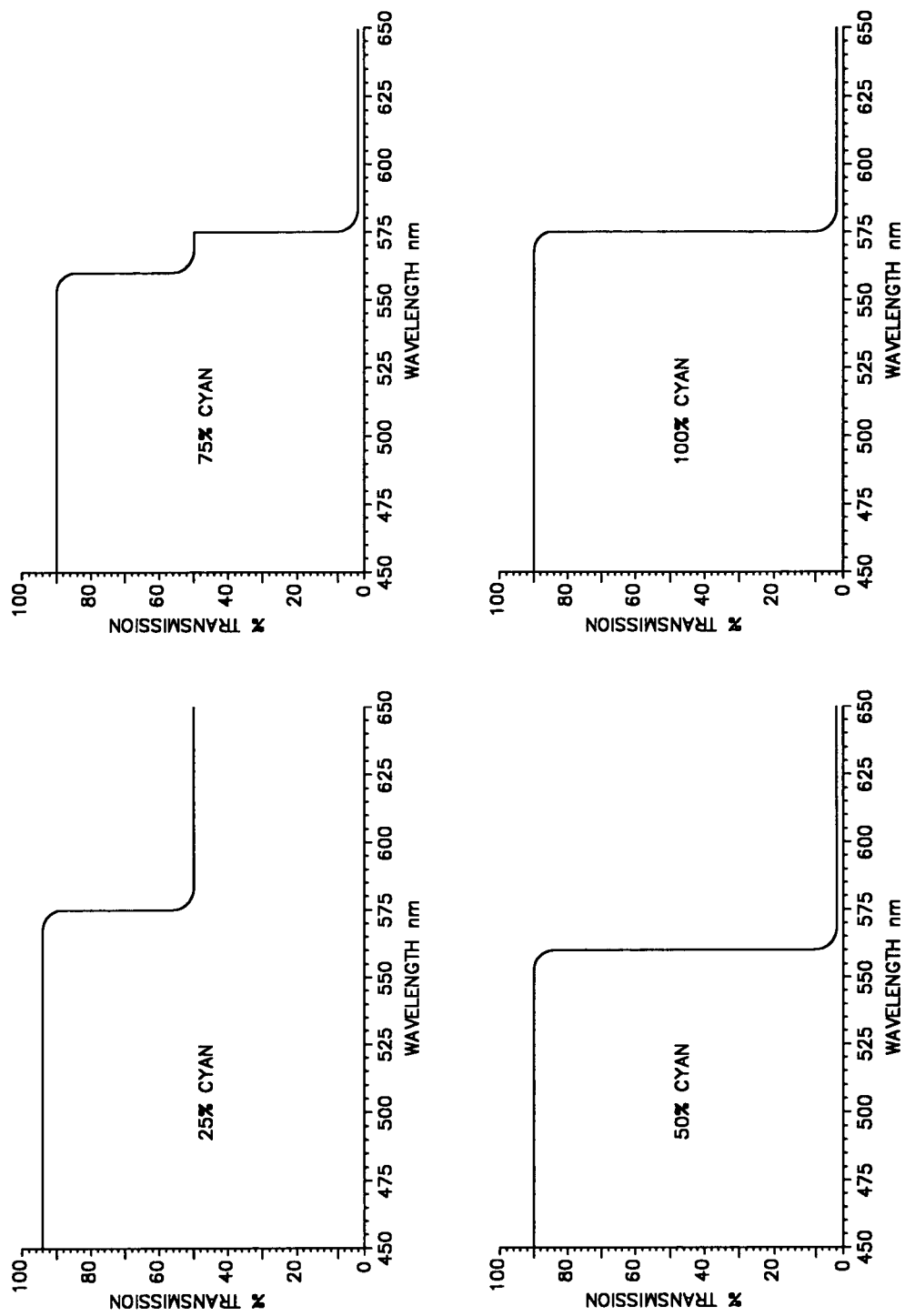
FIG. 16 shows the successive light transmission plots for a two stage cyan filter.

The chief advantage of the two stage filter element 20, 20', and 20" of the present invention, a brighter projected image, can be seen in FIGS. 11–14. FIG. 11 shows the light transmission plot when the filter element 20, 20', 20" is introduced into the light beam 24 so that the saturated color area 2022 affects the light beam 24. The resultant color is saturated 100% magenta light. FIG. 12 illustrates the situation as the saturated color gradient segment 2021 is introduced into the light beam 24, with the rejection bandwidth of the color being narrowed to lighten the color, but with a high percentage of transmitted light being retained. FIGS. 13 and 14 show the progression of this process as the solid pastel area 2012 of the filter element 20, 20', 20" and the gradient pastel area 2011 are respectively introduced into the light beam 24.

As can be seen by comparing the areas under the curve in FIGS. 14 and 10, when the gradient pastel area 2011 is in the light beam 24, the resultant color is a very light pastel, but is much brighter than the prior art color, with the overall area under the curve being greater. (The overall ratios of rejected light to fully transmitted light are roughly equivalent.) In addition to other applications, the brightness advantage is also important in the television industry, where the TV cameras see only the pastel colors. Only the first stage 201, the pastel areas, of the filter elements would be used for television. Using the second stage 202, the saturated color areas, would only reduce the light level available to the camera. The camera does not detect wavelengths beyond the pastels. A pastel color that would normally be very dark with prior art filter elements is much more visible to the TV camera with the brighter image produced by the filter elements 20, 20' and 20" of the present invention.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A lighting system comprising:
a light source,
a means of collecting and focusing light from said light source,
an aperture,
at least one color filter, and
an image lens; wherein
a light beam from said light source is focused through said aperture to define an object to be projected, said aperture being positioned upstream of said color filter, and
said filter comprises a first gradient region that is partially coated with a pastel color filter medium, and a second gradient region that is partially coated with a saturated color filter medium.

2. The lighting system of claim 1 wherein:
said filter and said image lens are deployed in an area of said light beam where a diameter of said light beam is smaller than a diameter of said aperture.

3. The lighting system of claim 1 wherein:
said filter is a two stage filter, said filter comprising
a first region that is coated with said pastel color filter medium, and
a second region that is coated with said saturated color filter medium.

4. The lighting system of claim 3 wherein:
said first region overlaps said second gradient region.

5. The lighting system of claim 3 wherein:
said filter is formed from a single substrate.

6. The lighting system of claim 3 wherein:
said filter is formed from two substrates, said substrates being bonded together to form said filter.

7. The lighting system of claim 6 wherein:
said first region and said first gradient region are formed on a first one of said substrates, and
said second region and said second gradient region are formed on a second one of said substrates.

8. The lighting system of claim 3 wherein:
a centerline of said filter lies on an arc.

9. The lighting system of claim 8 wherein:
said filter is formed from a single substrate.

10. The lighting system of claim 8 wherein:
said filter is formed from two substrates, said substrates being bonded together to form said filter.

11. The lighting system of claim 10 wherein:
said first region and said first gradient region are formed on a first one of said substrates, and
said second region and said second gradient region are formed on a second one of said substrates.

12. The lighting system of claim 3 wherein:
a centerline of said filter lies on a straight line.

13. The lighting system of claim 8 wherein:
said filter is formed from a single substrate.

14. The lighting system of claim 8 wherein:
said filter is formed from two substrates, said substrates being bonded together to form said filter.

15. The lighting system of claim 10 wherein:
said first region and said first gradient region are formed on a first one of said substrates, and
said second region and said second gradient region are formed on a second one of said substrates.

16. A two stage filter comprising:
a first gradient region that is partially coated with a pastel color filter medium,
a first region that is coated with said pastel color filter medium, a second gradient region that is partially coated with a saturated color filter medium, and a second region that is coated with said saturated color filter medium.

17. The lighting system of claim 16 wherein:
said first region overlaps said second gradient region.

18. The two stage filter of claim 16 wherein:
said filter is formed from a single substrate.

19. The two stage filter of claim 16 wherein:
said filter is formed from two substrates, said substrates being bonded together to form said filter.

20. The two stage filter of claim 19 wherein:
said first region and said first gradient region are formed on a first one of said substrates, and
said second region and said second gradient region are formed on a second one of said substrates.

21. The two stage filter of claim 16 wherein:
a centerline of said filter lies on an arc.

22. The two stage filter of claim 21 wherein:
said filter is formed from a single substrate.

23. The two stage filter of claim 21 wherein:
said filter is formed from two substrates, said substrates being bonded together to form said filter.

24. The two stage filter of claim 23 wherein:
said first region and said first gradient region are formed on a first one of said substrates, and
said second region and said second gradient region are formed on a second one of said substrates.

25. The two stage filter of claim 16 wherein:
a centerline of said filter lies on a straight line.

26. The two stage filter of claim 25 wherein:
said filter is formed from a single substrate.

27. The two stage filter of claim 25 wherein:
said filter is formed from two substrates, said substrates being bonded together to form said filter.

28. The two stage filter of claim 27 wherein:
said first region and said first gradient region are formed on a first one of said substrates, and
said second region and said second gradient region are formed on a second one of said substrates.

* * * * *